United States Patent [19]
Hayter et al.

[11] Patent Number: 5,629,937
[45] Date of Patent: May 13, 1997

[54] APPARATUS AND METHOD FOR ATM QUEUING AND SCHEDULING

[75] Inventors: Andrew T. Hayter, Bitterne Park; Simon P. Davis, Romsey; Paul P. Momtahan, Totton, all of England; Eugen B. Wallmeier, Eichenau, Germany

[73] Assignees: Roke Manor Research Limited, Hampshire, England; Siemens Aktiengesellschaft, Munich, Germany

[21] Appl. No.: 408,997

[22] Filed: Mar. 23, 1995

[30] Foreign Application Priority Data

Mar. 23, 1994 [GB] United Kingdom ............... 9405788

[51] Int. Cl.$^6$ ............................ H04J 3/22; H04J 3/14
[52] U.S. Cl. .................... 370/233; 370/238; 370/399; 370/412
[58] Field of Search .................. 370/13, 17, 14, 370/60.1, 60, 61, 85.6, 94.1, 94.2, 110.1, 58.1, 58.2, 58.3, 79, 80, 85.7, 95.1

[56] References Cited

U.S. PATENT DOCUMENTS 5,253,247 10/1993 Hirose et al. ..................... 370/14
5,278,825 1/1994 Wallmeier .
5,400,336 3/1995 Boyer et al. ..................... 370/94.1

FOREIGN PATENT DOCUMENTS

WO93/11621 6/1993 WIPO .

*Primary Examiner*—Wellington Chin
*Assistant Examiner*—Huy D. Vu
*Attorney, Agent, or Firm*—Hill, Steadman & Simpson

[57] ABSTRACT

An apparatus having a buffer store connected to an input line upon which ATM cells are received, and an output line upon which ATM cells are transmitted is provided. A control device receives, for each cell, a channel identifier and a path identifier from which a first signal is generated indicative of a maximum delay value which is applied to the buffer store and used to schedule the particular cell for transmission on a calendar controlling a sustainable cell rate. The control device generates a second signal indicative of a minimum delay value which is applied to the buffer and, in conjunction with the first signal, is used to schedule the particular cell for transmission on a calendar controlling the peak cell rate. The apparatus can also handle routing information, where a group of channel connections define a Route which share a peak cell rate for the Route and are scheduled on the peak cell rate calendar.

5 Claims, 6 Drawing Sheets

APPARATUS AND METHOD FOR ATM QUEUING AND SCHEDULING

BACKGROUND OF THE INVENTION

1. Field of the Invention

The present invention relates generally to switching networks and more specifically to an apparatus and a method for queuing and scheduling asynchronous transfer mode (ATM) cells in an ATM switch.

2. Description of the Related Art

ATM networks and switches support a mixture of traffic, including bursty traffic. By its nature, bursty traffic requires high bit rates for part of the time and little or no bit rate for the rest of the time. In order to efficiently use the bit rate available in a network, it is necessary to allocate a connection a lower bit rate than its peak bit rate such that the total peak bit rate of all the connections may be greater than the bit rate of the network links.

To support this situation, an ATM multiplexer requires large buffers at the input of the switch to buffer cells when they arrive at the multiplexer and cannot be transmitted across it, and buffers at the output of the switch, so that traffic may be shaped, whereby the profile of the traffic is altered before transmission from the switch. Such a switch with large buffers is termed a large buffered switch.

In an ATM network, a user, who wishes to set up a connection-orientated virtual channel connection in a quality of service category where statistical gain is required, will have to negotiate with the network at least three traffic parameters. These parameters will include the peak cell rate, the sustainable cell rate and some measure of the maximum burst size. Output buffers are therefore required to store cells so that they are transmitted at their sustainable cell rate but not above their peak cell rate. This process must be completed for a plurality of ATM virtual channel connections.

German patent application number 93120828.4 discusses an egress shaping algorithm. If the sum of the sustainable cell rates for connections accepted for an egress network link can be handled by the bit rate available for statistically multiplexed services on a network link, the egress scheduler/shaper disclosed in the application referred to above can guarantee a minimum service rate equal to the sustainable cell rates for each connection on a link using a simple resource allocation procedure which can provide high levels of statistical gain with bounded buffer sizes.

Referring to FIG. 1, this prior art block diagram shows how ATM cells 2 enter the system on an input line. This line comes from the part of the device which has multiplexed all the cells destined for this egress queue. The virtual path identifier/virtual channel identifier VPI/VCI of the cell is used to obtain the maximum allowed delay, Dmax, in order to maintain the sustainable cell rate as the minimum service rate for that virtual channel connection. The value Dmax is then fed into a cell buffer manager 4 from a leaky bucket manager 6. The cell buffer manager 4 schedules the cell for transmission via a calendar mechanism. The output line transfers cells from the calendar, however, they may be multiplexed together with other cells before being transmitted onto the network egress link.

The known calendar mechanism used is shown in FIG. 2, in which the following abbreviations are used. FLT is the Free List Tail. FLH is the Free List Head. CET is the Calendar Entry Tail. CEH is the Calendar Entry Head. OLT is the Output List Tail, and OLH is the Output List Head. The constituent components of the cell buffer manager are the cell memory, the calendar and a series of pointers. When a cell arrives at the cell buffer manager, a free cell location is taken from the head of the free cell list and the cell is copied to this location. The cell is then scheduled onto the calendar at time T+Dmax (modulo $N_{CA}$) where time T is the current time and $N_{CA}$ is the size of the calendar. If another cell is scheduled for the same time slot, then it is added to the front of the queue within the calendar time slot.

There are two output time pointers, a real time pointer T, and a read pointer RP which can move ahead of the real time pointer. While the RP and T pointers point to the same time slot, the complete linked list of cells connected to a time slot is transferred to the output queue. If the RP pointer moves ahead of the T pointer, then when it finds a time slot with cells in it, the cells are moved to the output queue one at a time so that there is never more than one cell in the output buffer. The reason for this is that the RP pointer is moving ahead of the time when the cell must be transmitted from the output calendar, denoted by pointer T. If a cell arrives at the output calendar and it requires that it be scheduled immediately at time T, the cell must be transferred to the output queue directly and should be transmitted from the output queue without delay. For this reason the output queue must never have more than one cell in it when the pointer RP is ahead of the real time pointer T. However, in this situation, pointer RP may remain at its position to a cell slot ahead of pointer T.

If a cell arrives at the calendar and requires to be scheduled between pointers T and RP, the cell is scheduled, but also the pointer RP is returned to the time slot position of this newly scheduled cell. After processing it, the pointer RP then searches through the calendar again for non-empty time slots. The reason for this is that if the cell arrival rate is greater than the transmission rate, many cells may arrive at the calendar and require scheduling between pointers RP and T. Simply transferring them to the output port will leave cells with later departure times being transmitted before cells with immediate departure times. The pointer RP must always be pointing to the closest time slot to pointer T with cells in it.

In the situation where the pointer RP is ahead of the pointer T, if the load on the port increases, the linked lists associated with each time slot will increase in length and eventually the real time pointer T will "catch up" with the read pointer RP.

Thus it is possible for the read pointer to get ahead of the current time T but never behind. Hence, this algorithm will guarantee the sustainable cell rate for a given virtual channel connection but has no limit on the peak cell rate.

SUMMARY OF THE INVENTION

Therefore, it is an object of the present invention to provide an apparatus and a method for limiting the peak cell rate.

This and other objects are inventively achieved in the present invention which provides an improvement in an apparatus and method for queuing and scheduling ATM cells. The cells are connected to an output side of an ATM switch including: buffer means connected to an input line upon which ATM cells are received; an output line upon which ATM cells are transmitted; control means for receiving, for each cell, a channel identifier and a path identifier from which a first signal is generated indicative of a maximum delay value which is applied to the buffer means and used to schedule the particular cell for transmission on a calendar controlling a sustainable cell rate. The improvement includes means for generating a second signal indicative of a minimum delay value which is applied to the buffer means and, simultaneously with the first signal, is used to schedule the particular cell for transmission. The minimum delay value is used to control a further calendar for controlling a peak cell rate.

The method of the present invention has the steps of: generating a second signal indicative of minimum delay value by using the control means; applying the second signal indicative of a minimum delay value to the buffer means; simultaneously using the second signal with said first signal to schedule the particular cell for transmission.

An embodiment of the present invention will now be described with reference to the accompanying drawings.

DETAILED DESCRIPTION OF THE PREFERRED EMBODIMENTS

Figure 3:
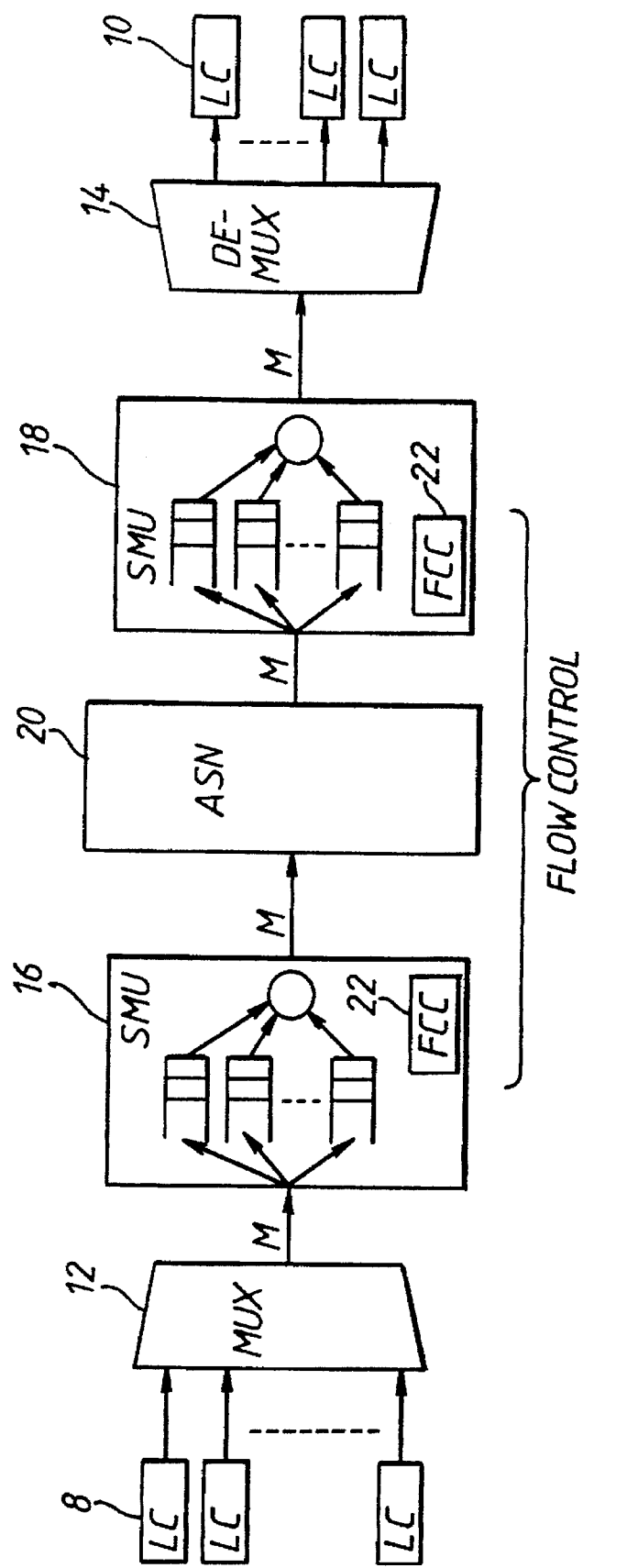
FIG. 3 shows a layout of an ATM switch of the present invention.

Referring to FIG. 3, shown on the ingress side are line cards 8. The outputs of the line cards 8 are connected to an input of an ATM multiplexer 12. The output of the multiplexer 12 is connected to an input of a statistical multiplexing unit (SMU) 16. The output of which is fed to the ATM switching network 20. The output of the switching network 20 is connected to an input of a further statistical multiplexing unit (SMU) 18. The output of SMU 18 is connected to an input of an ATM demultiplexer 14. The outputs of the ATM demultiplexer 14 are connected to the input of a plurality of line cards 10 which are on the egress side of the switching network. The links between the various components designated M represent multiplexed internal links. Each SMU 16, 18 has a flow control controller 22. The combination, for example, of the line cards 8, multiplexer 12 and statistical multiplexing unit 16 comprises a peripheral switch group. In practice there will be a number of peripheral switch groups connected to the ATM switching network. Within each statistical multiplexing unit 16 there is one input queue for each of the peripheral switch groups attached to the ATM switching network. Cells may be sent independently between any of the peripheral switch groups. There are limiting factors which control the cell rate. They are the output link bit rate from the ATM switching network to a peripheral switch group, and the output link bit rate from a peripheral switch group to the ATM switching network.

Flow control procedures operate to manage these limited bit rates fairly for all connections, both internally to the switch and between the peripheral switch groups, and to limit bit rate to peak reservation across the ATM switching network.

The present invention is conveniently located in the statistical multiplexing unit 18 and will now be described.

Figure 1:
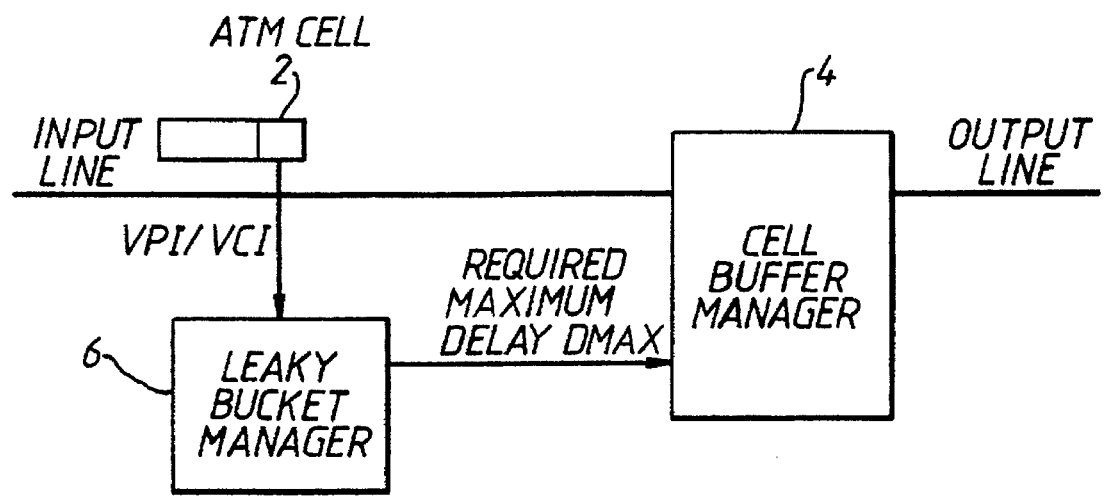
FIG. 1 shows a known layout of an ATM switch.
Figure 4:
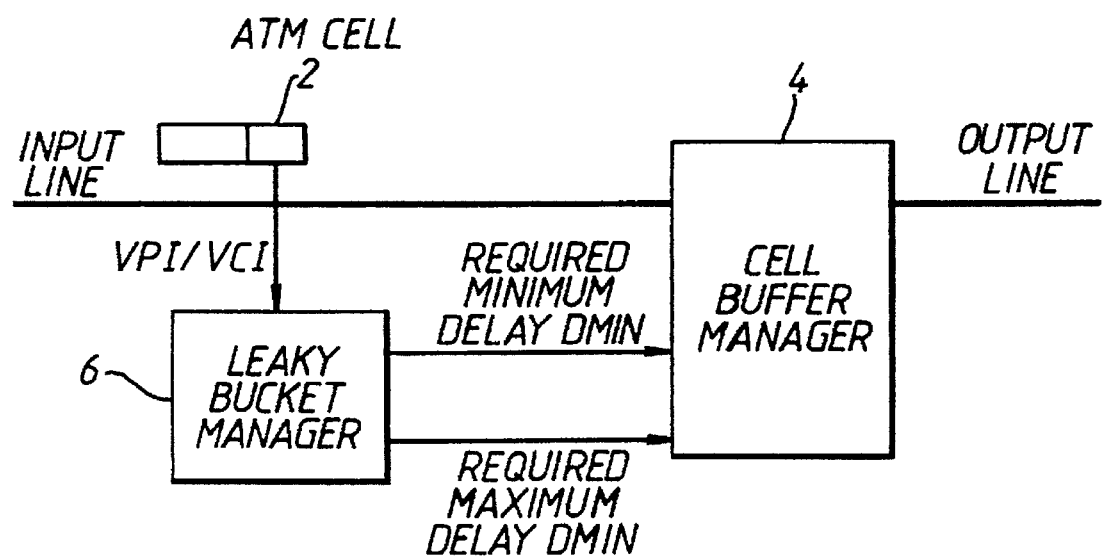
FIG. 4 shows a block diagram of an extended egress queuing and scheduling system of the present invention.

Referring now to FIG. 4, wherein like numerals represent like parts similar to FIG. 1, to take account of the peak cell rate, a similar value to that of Dmax (maximum interdeparture time) must be generated by the leaky bucket manager, corresponding to the earliest time at which a cell can be transmitted. This value, Dmin is defined as the minimum delay or "number of cell slots" before the cell can be transmitted.

The general principle of operation for this mechanism is that a cell can only be sent between the time interval calculated from its peak cell rate and the time interval calculated from its sustainable cell rate. Under low load conditions cells will be sent closer to the peak cell rate, whereas at high loads this will tend towards the sustainable cell rate.

The method described below uses two scheduling mechanisms for the same cell. One of these mechanisms schedules the cell for the minimum time, the peak cell rate, and the other schedules the cell for the minimum time sustainable cell rate. The peak cell rate calendar is read in real time which ensures that cells cannot be sent before the peak cell rate criterion is met. However, the sustainable cell rate calendar may be read before, but never after, the maximum time, sustainable cell rate, thus allowing a service rate of greater than or equal to the sustainable cell rate. When both scheduled events (from the peak cell rate and sustainable cell rate calendars) are processed, the real cell can be sent.

The two values from the leaky bucket manager 6 (Dmax and Dmin) are used by the new cell buffer manager 4 to schedule events onto two separate calendars. The first calendar, termed the sustainable cell rate calendar, is the same as that described in the above-referenced German patent application. The second calendar is called the peak cell rate calendar.

Figure 2:
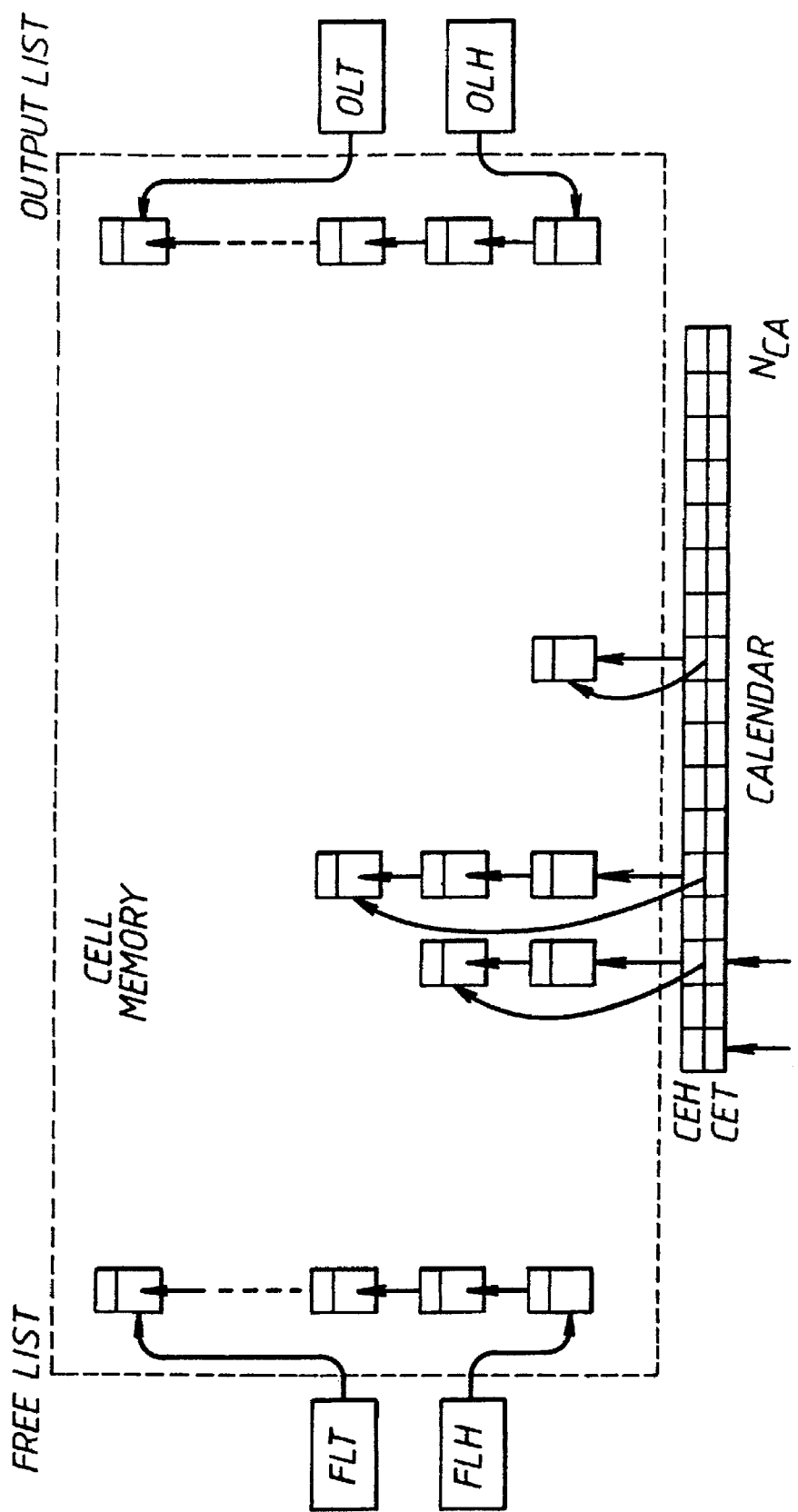
FIG. 2 shows a known calendar mechanism of an ATM switch.
Figure 5:
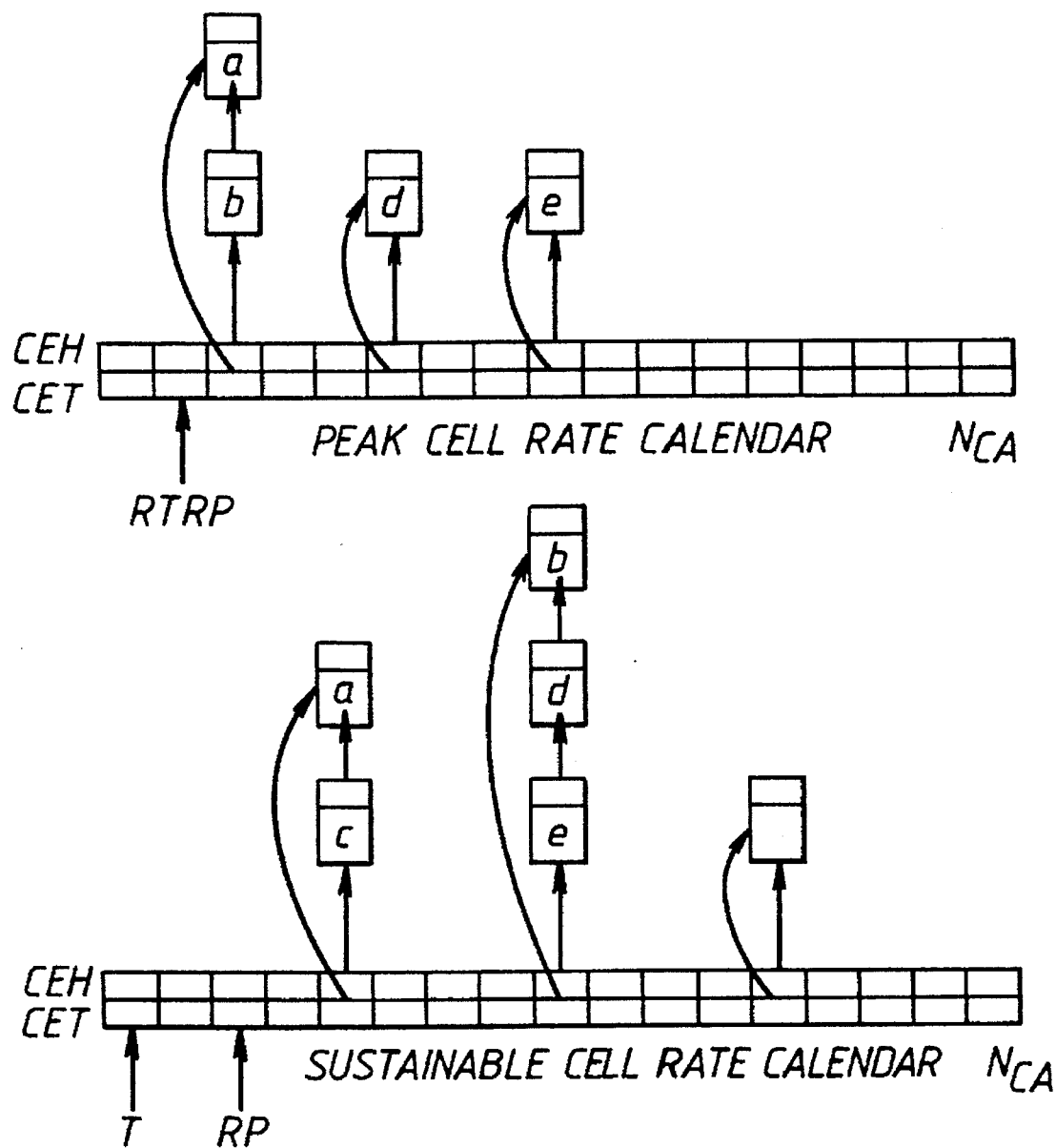
FIG. 5 shows a peak cell rate calendar and a sustainable cell rate calendar of the present invention.

Referring now to FIG. 5, a comparison is shown between the sustainable cell rate calendar and the peak cell rate calendar. The value T+Dmin is used to schedule a cell onto the calendar. Also, a real time read pointer RTRP is used instead of the read pointer. The pointer RTRP is incremented each time slot and thus cannot run ahead of time. The pointer RTRP is also equal to the real time pointer T, used for the sustainable cell rate calendar shown in FIG. 2.

Figure 6:
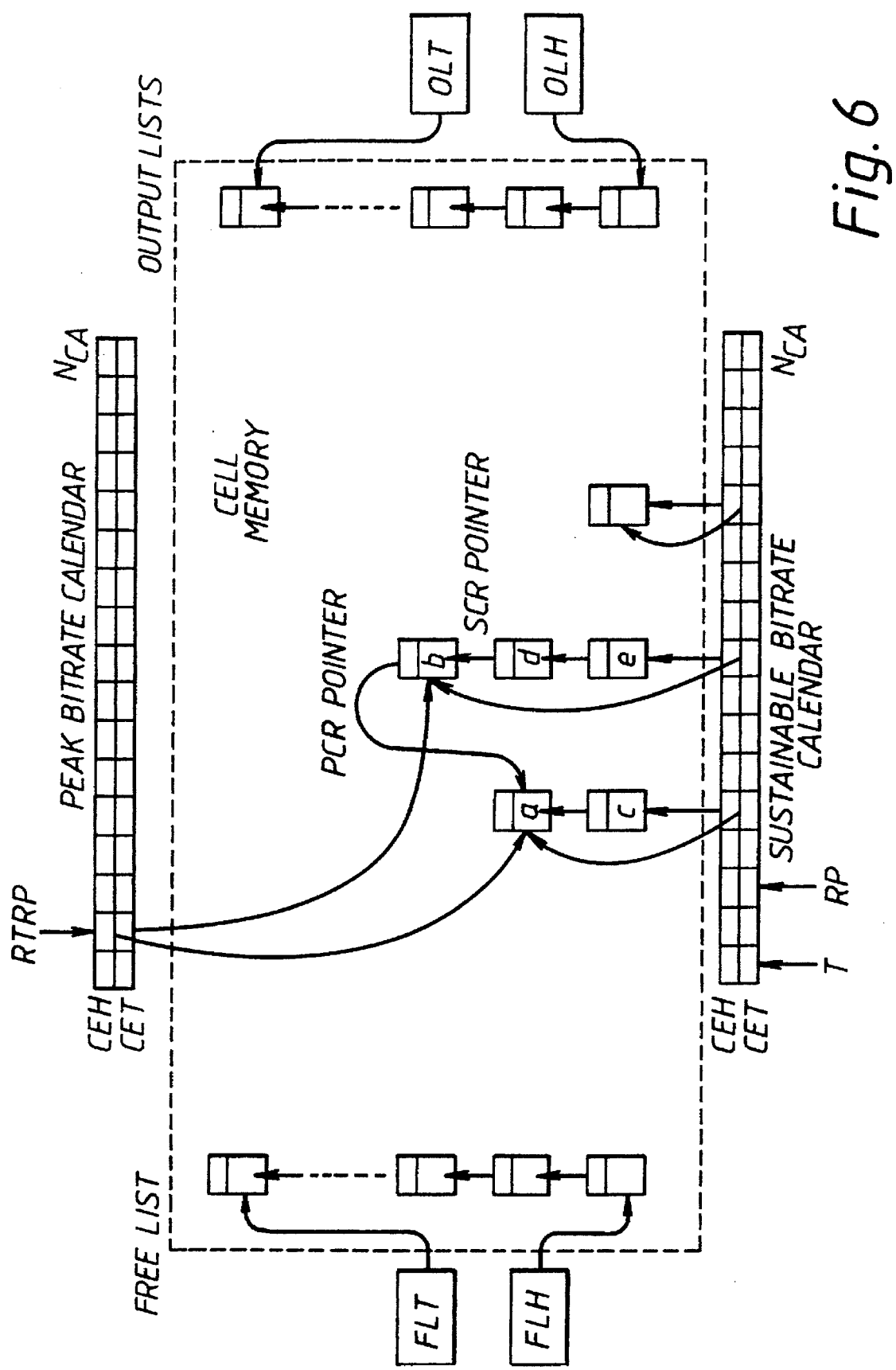
FIG. 6 shows the interaction between the peak cell rate and sustainable cell rate calendars of the present invention.

In FIGS. 5 and 6, the following abbreviations are used. FLT is the Free List Tail. FLH is the Free List Head. CET is the Calendar Entry Tail. CEH is the Calendar Entrny Head. RP is the Read Pointer. T is the Real Time Pointer. POLT is the Peak Output List Tail. POLH is the Peak Output List Head. SOLT is the Sustainable Output List Tail. SOLH is the Sustainable Output List Head, and NCA is the Size of Calendar.

Each cell only needs to be stored once on the cell memory, but requires two pointers, the sustainable cell rate pointer and the peak cell rate pointer. The manner in which this works logically is illustrated in FIGS. 5 and 6. In FIG. 5, cells a, b, d and e are shown as scheduled on both the sustainable cell rate calendar and the peak cell rate calendar. Cells b and a form a time slot queue on the peak cell rate calendar. The peak cell rate pointers for these cells are linked together and attached to a peak cell rate calendar time slot indicating their minimum departure time delay. However, cells b, d and e form a time slot queue on the sustainable cell rate calendar. The sustainable cell rate pointers for these cells are linked together and attached to a sustainable cell rate calendar time slot indicating their maximum departure time delay. The interaction between these two calendars with a common cell memory is shown in FIG. 6.

Referring to FIG. 6, cell b is shown linked onto both calendars via separate pointers. In this illustration the pointers and cells are shown adjacent to each other; however, this is a logical representation. A cell is stored in memory and a pointer identifies it; however, the pointer may exist in a different area of memory than the cell that it identifies.

The pointers T and RTRP point to cell slots on different calendars, but which represent the same time. The peak cell rate calendar time slot is always processed before the sustainable cell rate calendar time slot. Processing of the peak cell rate time slot requires all the cells attached to it to have their peak cell rate pointer values convene to a known null value, for example zero. From the sustainable cell rate calendar, all cells processed with their peak cell rate pointer value set to zero may be transferred to the output queue. Cells attached to the sustainable cell rate calendar which do not have their peak cell rate pointers set to zero when they are processed by the sustainable cell rate calendar are left on the sustainable cell rate calendar. Therefore, the peak cell rate calendar time slot must always be processed first, as explained above to minimize cells left on the calendar.

The cells left on the sustainable cell rate calendar which have not had their peak cell rate pointers set to zero are monitored such that when their peak cell rate pointers are set to zero, the sustainable cell rate read pointer RP moves back to them and transfers them to the output queue. From this new point it then starts searching forward again.

The invention as described above may be extended to "Routes". Routes are defined for a group of virtual channel connections with separate quality of services but the same peak cell rate. Connections accepted on the basis of their sustainable cell rate may use Routes to define both the peak cell rate and implicitly the path to the next large buffered switch through a number of cross-connects. The calendar scheduling algorithm must thus be able to schedule cells according to their sustainable cell rate value associated with their virtual channel connection and to their peak cell rate value associated with their Route.

Figure 7:
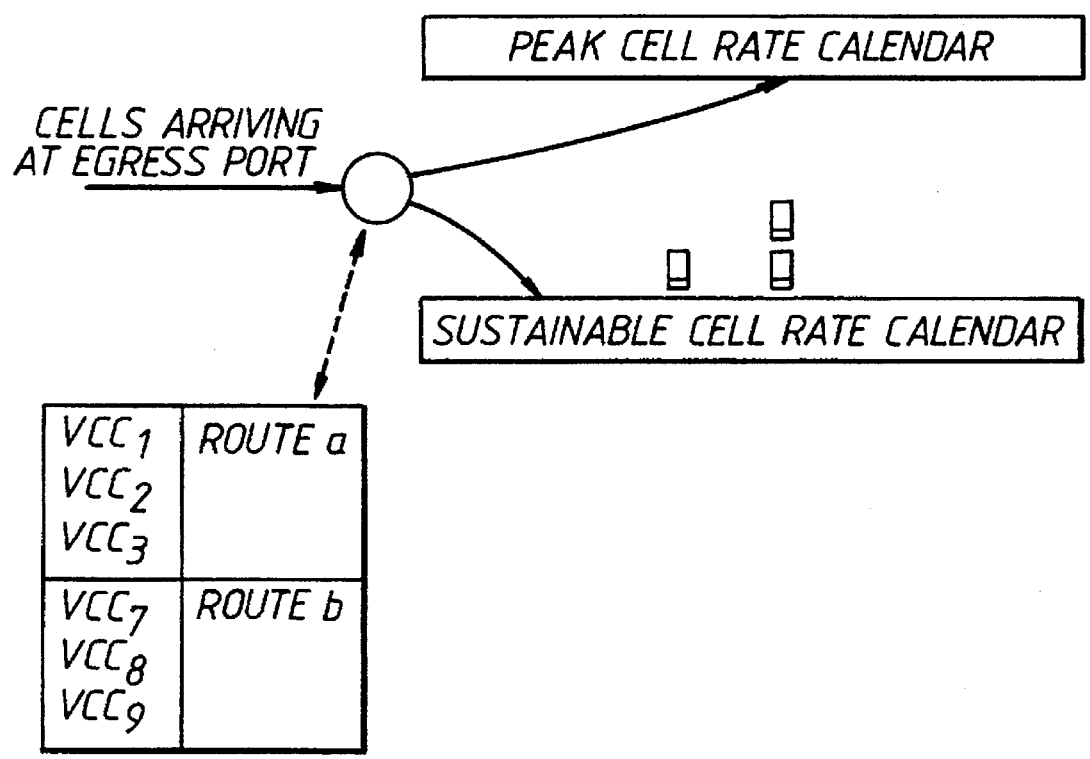
FIG. 7 shows the peak cell rate and sustainable cell rate calendars of the present invention extended to handle "Routes" as described below.

The diagram in FIG. 7 shows the calendar in schematic form with the additions required for handling Routes. This quite clearly handles Routes with only a minor modification to the look-up table so that the peak cell rate for a Route is shared between several virtual channel connections VCCs, and may thus be jointly scheduled by the peak cell rate calendar.

It will therefore be appreciated that in a network composed of a number of ATM switches, a bursty data connection will be set up by defining the traffic characteristics. These are, for example, the sustainable cell rate, the peak cell rate and the maximum burst size. While passing through the ATM switch, the traffic characteristics may be outside the agreed parameters, and therefore are liable to be deleted. The present invention as described performs traffic shaping on VCC connections of ATM cells so that they are output from the switch within the parameters assigned to them, namely the sustainable cell rate, the peak cell rate and the maximum burst size.

It will be readily appreciated by those skilled in the art that various modifications are possible without departing from the scope of the invention as claimed.

Although other modifications and changes may be suggested by those skilled in the art, it is the intention of the inventors to embody within the patent warranted hereon all changes and modifications as reasonably and properly come within the scope of their contribution to the art.

We claim:

1. In an apparatus for queuing and scheduling ATM cells connected to an output side of an ATM switch including buffer means connected to an input line upon which ATM cells are received, an output line upon which ATM cells are transmitted, control means for receiving, for each cell, a channel identifier and a path identifier from which a first signal is generated indicative of a maximum delay value which is applied to the buffer means and used to schedule a particular cell for transmission on a first calendar for controlling a sustainable cell rate, the improvement comprising:

means for generating in said control means a second signal indicative of a minimum delay value simultaneously applied with the first signal to the buffer means to schedule the particular cell for transmission, wherein the minimum delay value controls a second calendar for controlling a peak cell rate, and wherein the means for generating in said control means a second signal indicative of a minimum delay value is further defined by utilizing a value T+Dmin to schedule a cell onto the second calendar, where T is a real time value and Dmin is the minimum delay value and wherein the second calendar further comprises a real time read pointer for each cell incremented for each time slot, wherein each cell is applied only once to said buffer means and wherein each cell has a first pointer identifying its time slot in a peak cell rate calendar and a second pointer identifying its timeslot in the sustainable cell rate calendar.

2. The improvement of claim 1, wherein a group of channel connections defining a route share a peak cell rate for the route are scheduled on said peak cell rate calendar as a route and individually scheduled on said sustainable cell rate calendar.

3. In an apparatus for queuing and scheduling ATM cells connected to an output side of an ATM switch including buffer means connected to an input line upon which ATM cells are received, an output line upon which ATM cells are transmitted, control means for receiving, for each cell, a channel identifier and a path identifier from which a first signal is generated indicative of a maximum delay value which is applied to the buffer means and used to schedule a particular cell for transmission on a first calendar for controlling a sustainable cell rate, the improvement comprising:

means for generating in said control means a second signal indicative of a minimum delay value simultaneously applied with the first signal to the buffer means to schedule the particular cell for transmission by utilizing a value T+Dmin to schedule a cell onto a second calendar, where T is a real time value and Dmin is the minimum delay value, and wherein the minimum delay value controls the second calendar for controlling a peak cell rate, the second calendar further comprising:

a real time read pointer for each cell incremented for each time slot, wherein each cell is applied only once to said buffer means and wherein each cell has a first pointer identifying its time slot in a peak cell rate calendar and a second pointer identifying its time slot in the sustainable cell rate calendar.

4. A method of queuing and scheduling ATM cells connected to an output side of an ATM switch having buffer means connected to an input line upon which ATM cells are received, an output line upon which ATM cells are transmitted, control means for receiving, for each cell, a channel identifier and a path identifier from which a first signal is generated indicative of a maximum delay value which is applied to the buffer means and used to schedule the particular cell for transmission on a first calendar for controlling a sustainable cell rate, the method comprising the steps of:

generating a second signal indicative of minimum delay value by using said control means;

applying said second signal indicative of a minimum delay value to the buffer means;

simultaneously using said second signal with said first signal to schedule the particular cell for transmission;

storing each cell only once in said buffer means;

providing a first pointer for each cell to identify the cell time slot in a peak cell rate calendar; and providing a second pointer to identify the cell time slot in the sustainable cell rate calendar.

5. A method of queuing and scheduling ATM cells connected to an output side of an ATM switch having buffer means connected to an input line upon which ATM cells are received, an output line upon which ATM cells are transmitted, control means for receiving, for each cell, a channel identifier and a path identifier from which a first signal is generated indicative of maximum delay value which is applied to the buffer means and used to schedule the particular cell for transmission on a first calendar for controlling a sustainable cell rate, wherein a group of channel connections defining a route share a peak cell rate for the route, the method comprising the steps of:

generating a second signal indicative of minimum delay value by using said control means;

applying said second signal indicative of a minimum delay value to the buffer means;

simultaneously using said second signal with said first signal to schedule the particular cell for transmission;

scheduling the group of channel connections defining a route on a peak cell rate calendar as a route; and individually scheduling said group of channel connections defining a route on the sustainable cell rate calendar.

* * * * *